US009606530B2

(12) United States Patent
Aqlan et al.

(10) Patent No.: US 9,606,530 B2
(45) Date of Patent: Mar. 28, 2017

(54) DECISION SUPPORT SYSTEM FOR ORDER PRIORITIZATION

(71) Applicants: International Business Machines Corporation, Armonk, NY (US); The Research Foundation of State University of New York, Binghamton, NY (US)

(72) Inventors: Faisal Aqlan, Poughkeepsie, NY (US); Keila Y Martinez Camacho, Wallkill, NY (US); Sarah S Lam, Binghamton, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 793 days.

(21) Appl. No.: 13/897,250

(22) Filed: May 17, 2013

(65) Prior Publication Data

US 2014/0343711 A1    Nov. 20, 2014

(51) Int. Cl.
*G06G 7/00* (2006.01)
*G06N 3/00* (2006.01)
*G05B 19/418* (2006.01)

(52) U.S. Cl.
CPC ............ *G05B 19/41865* (2013.01); *G05B 2219/32027* (2013.01); *G05B 2219/32266* (2013.01);
(Continued)

(58) Field of Classification Search
CPC .... G05B 19/41865; G05B 2219/32027; G05B 2219/32266; G05B 19/41885;
(Continued)

(56) References Cited

U.S. PATENT DOCUMENTS 5,630,070 A * 5/1997 Dietrich et al. ............. 705/7.23
5,971,585 A * 10/1999 Dangat et al. ............... 700/102
(Continued)

OTHER PUBLICATIONS

'A Weighted-Gradient Approach to Multi-Objective Linear Programming Problems Using the Analytic Hierarchy Process': Arbel, Tel Aviv University, 1993.*
(Continued)

*Primary Examiner* — Stanley K Hill
*Assistant Examiner* — Peter Coughlan
(74) *Attorney, Agent, or Firm* — Kunzler Law Group

(57) ABSTRACT

A method for order prioritization includes calculating a cycle time for a product order of a plurality of product orders using an artificial neural network, determining a first order priority of the product order based on a priority index using an analytic hierarchy process, determining a second order priority of the product order based on event based simulation model, and determining a shipping date for the product order based on the second order priority. The artificial neural network calculates the cycle time based upon product order type and a plurality of component counts. The analytic hierarchy process determines a first order priority based upon a plurality of product order attributes. The simulation model determines a second order priority and completion time based upon the first order priority, product model, product type, a plurality of component counts, manufacturing capacity and inventory data, and production time data for historical product orders.

17 Claims, 8 Drawing Sheets

(52) U.S. Cl.
CPC ............... *Y02P 90/18* (2015.11); *Y02P 90/20* (2015.11); *Y02P 90/26* (2015.11)

(58) Field of Classification Search
CPC .......... Y02P 90/18; Y02P 90/20; Y02P 90/16; G06K 9/6253; G06K 9/6282; G06N 7/005; G06N 3/00; G06G 7/00
USPC ........................................................... 706/39
See application file for complete search history.

(56) References Cited

U.S. PATENT DOCUMENTS

| | | | |
|---|---|---|---|
| 7,142,939 B2* | 11/2006 | Nonaka et al. ............... | 700/121 |
| 7,373,371 B2* | 5/2008 | Eck et al. ........................ | 705/29 |
| 7,668,761 B2* | 2/2010 | Jenkins et al. ................. | 705/28 |
| 7,747,478 B2* | 6/2010 | Agrawal et al. ................ | 705/28 |
| 7,949,501 B1* | 5/2011 | Iravani ............ | G05B 19/41885 703/6 |
| 8,090,668 B2* | 1/2012 | Lee et al. ........................ | 706/12 |
| 2008/0077544 A1* | 3/2008 | Sureka ................. | G06K 9/6253 706/13 |
| 2010/0070315 A1 | 3/2010 | Lu et al. | |

OTHER PUBLICATIONS

The grid: Blurprint for a new computing infrastructure: Foster, 1999, Morgan Kaufmann.*
Elements of artificial neural networks: Mehrotra, 1997, MIT press.*
'Approach to Job-Shop Scheduling Problem Using Rule Extraction Neural Network Model': Bashir, 2011, Global Journal of Computer Science and Technology.*
Zahari Taha et al., "A Fuzzy AHP-ANN-Based Decision Support System for Machine Tool Selection in a Flexible Manufacturing Cell", International Journal of Advanced Manufacturing Technology, v 57, n 5-8, p. 719-733, Nov. 2011; ISSN: 02683768, E-ISSN:14333015, Springer London.
Te Xu, Dug Hee Moon and Seung Geun Baek, A Simulation Study Integrated with Analytic Hierarchy Process (AHP) in an Automotive Manufacturing System, http://sim.sagepub.com/content/88/4/450, Simulation 2012 88: 450 originally published online May 23, 2011.
Hua Jiang and Junhu Ruan, Investment Risks Assessment on High-tech Projects Based on Analytic Hierarchy Process and BP Neural Network, Journal of Networks, vol. 5, No. 4, Apr. 2010.
Katariina Kemppainen, "Priority Scheduling Revisited—Dominant Rules, Open Protocols, and Integrated Order Management", HSE print 2005, ISSN 1237-556X, Helsinki School of Economics.

* cited by examiner

DECISION SUPPORT SYSTEM FOR ORDER PRIORITIZATION

BACKGROUND

Field

The subject matter disclosed herein relates to order prioritization and more particularly relates to a system for prioritizing customer orders in a manufacturing environment.

Description of the Related Art

Industrial manufacturing product orders often vary in terms of scale, complexity, features, and urgency. Manufacturers who can successfully balance production to meet customer demand and operational efficiency have an advantage over their competitors. Production scheduling is the allocation of resources to tasks over time and the determination of the sequence of operations to optimize certain criteria (e.g., efficiency) and meet the constraints of the manufacturing environment. Effective scheduling can minimize production time and cost, as well as reduce inventory and increase production efficiency. In many industrial applications, including high end server manufacturing, the due dates for product orders may vary. While product orders with earlier due dates logically should be processed first, other constraints (e.g., inventory and existing orders) may dictate otherwise.

BRIEF SUMMARY

A method for order prioritization includes calculating a cycle time for a product order of a plurality of product orders, determining a first order priority of the product order based on a priority index using an analytic hierarchy process, determining a second order priority of the product order based on event based simulation model, and determining a shipping date for the product order based on the second order priority.

In one embodiment, calculating a cycle time for a product order is performed by an artificial neural network. In a certain embodiment, the input to the artificial neural network includes product order type and a plurality of component counts, where a component count includes the number of units of a component used to manufacture the product of the product order. In another embodiment, the alternatives evaluated by the analytic hierarchy process includes the plurality of product orders and the criteria of the analytic hierarchy process includes a plurality of attributes for each product order or the plurality of product orders, where each criterion has a priority value. In a further embodiment, the input to the event based simulation model includes the first priority order of the product order, a second set of attributes for the product order including product type, product model, and a plurality of component counts, manufacturing capacity and inventory data relating to the product order, and production time data of historical product orders.

In yet another embodiment, the method includes validating the first order priority of the product order and determining a revised order priority of the product order based on a revised priority index using the analytic hierarchy process, where calculating the revised priority index includes adjusting the priority value of one or more criterion of the product order in the analytic hierarchy process. In a particular embodiment, determining a revised order priority of the product order includes revising the order priority for one or more other product orders. In another embodiment, the artificial neural network is trained using historical product order data, including cycle time, product order type, and a plurality of component counts, where a component count includes the number of units of a component used to manufacture the product of the product order.

In yet another embodiment, the plurality of attributes for each product order includes order type, cut-off date, cycle time, critical customer issues, pending time, and requested ship date. In a further embodiment, the manufacturing capacity and inventory data relating to the product order includes lead time and a plurality of component inventory counts, where a component inventory count includes the available number of units of a component used to manufacture the product of the product order. In another embodiment, the production time data of historical product orders include assembly time, testing time, visual inspection time, and packaging time. In an embodiment, determining a shipping date for a product order includes adjusting the shipping date for one or more other product orders.

An apparatus for order prioritization includes a cycle time calculation module, a priority determination module, a simulation module, and a scheduling module. In one embodiment, the cycle time calculation module calculates a cycle time for a product order of a plurality of product orders using an artificial neural network, the artificial neural network receiving inputs that include product order type and a plurality of components counts, where a component count includes the number of units of a component used to manufacture the product of the product order. In another embodiment, the priority determination module determines a first order priority for a product order based on a priority index calculated using an analytic hierarchy process, where the alternatives evaluated by the analytic hierarchy process includes the plurality of product orders and the criteria of the analytic hierarchy process includes a plurality of attributes for each product order of the plurality of product orders, with each criterion having a priority value.

In a further embodiment, the simulation module determines a second order priority of a product order by running an event based simulation model, the event based simulation model receiving inputs that include the first order priority of the product order, a second set of attributes of the product order, manufacturing capacity and inventory data relating to the product order, and production time data of historical product orders. In an embodiment, the second set of attributes of the product order includes product type, product model, and a plurality of component counts. In a further embodiment, the scheduling module determines a shipping date for the product order based on the second order priority of the product order.

In one embodiment, the apparatus includes a validation module that validates the first order priority of the product order. In another embodiment, the priority determination module further determines a revised order priority of the product order based on a revised priority index from the analytic hierarchy process, where calculating the revised priority index includes adjusting the priority value of one or more criterion of the product order in the analytic hierarchy process. In yet another embodiment, determining a revised order priority of the product order includes revising the order priority for one or more other product orders. In a further embodiment, the artificial neural network is trained using historical product order data that includes cycle time, product order type, an a plurality of components counts, where a component count includes the number of units of a component used to manufacture the product of the product order. In an embodiment, the plurality of attributes for each product order includes order type, cut-off date, cycle time, critical customer issues, pending time, and requested ship date.

In one embodiment, the manufacturing capacity and inventory data relating to the product order includes lead time and a plurality of component inventory counts, where a component inventor count includes the available number of units of a component used to manufacture the product of the product order. In another embodiment, the production time data of historical product orders includes assembly time, testing time, visual inspection time, and packaging time. In a further embodiment, determining a shipping date for a product order includes adjusting the shipping date for one or more other product orders.

A computer program product for order prioritization, the computer program product including a computer readable storage medium having program code embodied thereon, the program code readable/executable by a processor to calculate a cycle time for a product order of a plurality of product orders, determine a first order priority of the product order based on a priority index calculated using an analytic hierarchy process, determine a second order priority of the product order, and determine a shipping date for the product order based on the second order priority.

In one embodiment, calculating a cycle time for a product order is performed by an artificial neural network. In a certain embodiment, the input to the artificial neural network includes product order type and a plurality of component counts, where a component count includes the number of units of a component used to manufacture the product of the product order. In another embodiment, the alternatives evaluated by the analytic hierarchy process includes the plurality of product orders and the criteria of the analytic hierarchy process includes a plurality of attributes for each product order or the plurality of product orders, where each criterion has a priority value. In a further embodiment, the input to the event based simulation model includes the first priority order of the product order, a second set of attributes for the product order including product type, product model, and a plurality of component counts, manufacturing capacity and inventory data relating to the product order, production time data of historical product orders, and available production capacity.

In one embodiment, the computer program product is configured to validate the first order priority of the product order. In another embodiment, the computer program product is configured to determine a revised order priority of the product order based on a revised priority index from the analytic hierarchy process, where calculating a revise priority index includes adjusting the priority value of one or more criterion of the product order in the analytic hierarchy process. In a further embodiment, the artificial neural network is trained using historical product order data that includes cycle time, product order type, an a plurality of components counts, where a component count includes the number of units of a component used to manufacture the product of the product order. In an embodiment, the plurality of attributes for each product order includes order type, cut-off date, cycle time, critical customer issues, pending time, and requested ship date.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
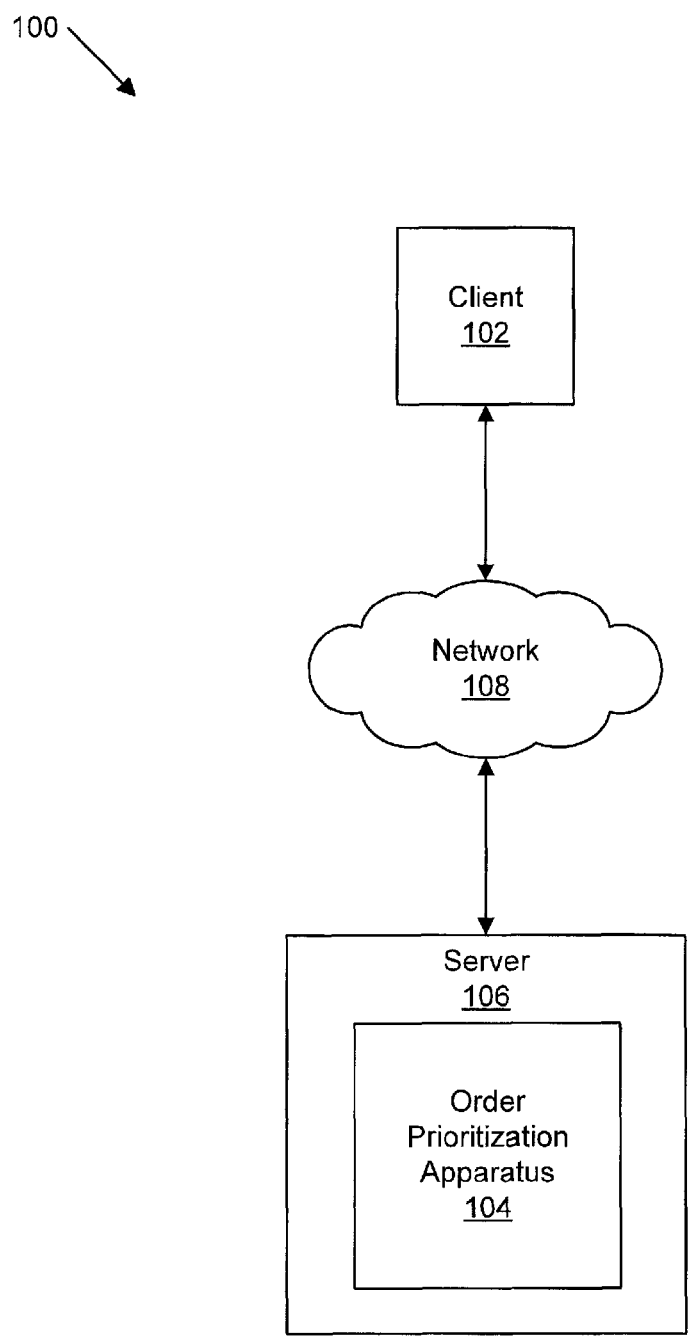
FIG. 1 is a schematic block diagram illustrating one embodiment of a system for determining the priority and shipping date of an order for a manufactured article.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

FIG. 1 is a schematic block diagram illustrating one embodiment of a system for determining the priority and shipping date of an order for a manufactured article. The system 100 includes a client 102 connected to an order prioritization apparatus 104 on a server 106 through a network 108, which are described below.

In one embodiment, the system includes an order prioritization apparatus 104 on a server 106. The order prioritization apparatus 104 receives product order data from a client 102 over a network 108. The order prioritization apparatus 104 is described in more detail with respect to the apparatus 200 in FIG. 2. The client 102 may be any device capable of sending product order data to a server 104 over a network 108. For example, the client 102 may be a laptop or desktop computer. In another example, the client 102 may be a tablet. In further example, the client 102 may be a smartphone. The client 102 could also be another server. The network 108 may include a local area network ("LAN"), a wide area network ("WAN"), wireless network, cellular network, the internet, or the like. In one embodiment, the order prioritization apparatus 104 may be accessed directly from a user interface to the server 106.

Figure 2:
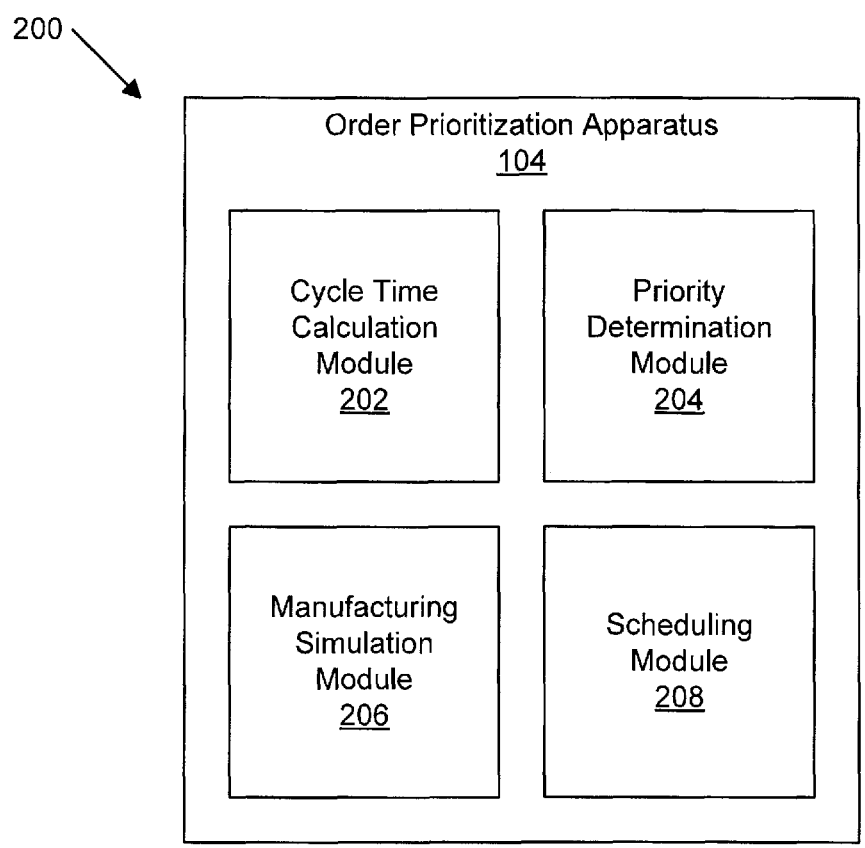
FIG. 2 is a schematic block diagram illustrating one embodiment of an apparatus for determining the priority and shipping date of an order for a manufactured article.

FIG. 2 is a schematic block diagram illustrating one embodiment of an apparatus 200 for determining the priority and shipping date of an order for a manufactured article. The apparatus 200 includes one embodiment of an order prioritization apparatus 104 with a cycle time calculation module 202, a priority determination module 204, a manufacturing simulation module 206, and a schedule module 208, which are described below.

The cycle time calculation module 202, in one embodiment, calculates the cycle time for a product order of a plurality of product orders using an artificial neural network 400. The artificial neural network 400 is described in more detail with respect to the diagram 400 in FIG. 4. The cycle time for a product order may be defined in various ways. In one instance, cycle time is the amount of time it takes to build or manufacture the product. In another instance, the cycle time for a product order is the elapsed time between when a product order is released to the manufacturing floor and the completion of the order. One of skill in the art will recognize other embodiments of a cycle time that may be calculated by the cycle time calculation module 202.

The priority determination module 204, in one embodiment, determines a first priority of a product order based upon a priority index for a plurality of product orders. In one embodiment, a first priority of a product order within a plurality of product orders that have been prioritized with respect to each other may be expressed as a whole number (e.g., 1, 2, 3, 5). The value of a first priority of a product order within a plurality of a product orders that have been prioritized with respect to each other may range from 1 to the number of product orders within the plurality of product orders. For example, the range of a first priority of a product order within a set of twenty product orders that have been prioritized with respect to each other is 1 to 20. In one instance, within a plurality of product orders that have been prioritized with respect to each other, the first priorities of any two product orders cannot be identical. Alternatively, within a plurality of product orders that have been prioritized with respect to each other, the first priorities of two or more product orders may be identical. In other embodiments, the priority determination module 204 may include first priorities that are expressed as letters, fractions, codes, or other suitable system where one product order priority may be expressed as higher than another product order priority.

The priority index for a plurality of product orders is calculated using an analytic hierarchy process 500. The analytic hierarchy process 500 is described in more detail with respect to diagram 500 in FIG. 5.

The manufacturing simulation module 206, in one embodiment, determines a second priority of a product order. In one embodiment, a second priority of a product order within a plurality of product orders that have been prioritized with respect to each other may be expressed as a whole number (e.g., 1, 2, 3, 5). The value of a second priority of a product order within a plurality of a product orders that have been prioritized with respect to each other may range from 1 to the number of product orders within the plurality of product orders. For example, the range of a second priority of a product order within a set of twenty product orders that have been prioritized with respect to each other is 1 to 20. In one instance, within a plurality of product orders that have been prioritized with respect to each other, the second priorities of any two product orders cannot be identical. Alternatively, within a plurality of product orders that have been prioritized with respect to each other, the second priorities of two or more product orders may be identical. In other embodiments, the manufacturing simulation module 206 may include second priorities that are expressed as letters, fractions, codes, or other suitable system where one product order priority may be expressed as higher than another product order priority.

The second priority of a product order is determined by an event based simulation model 600. The simulation model 600 is described in more detail with respect to diagram 600 in FIG. 6.

The scheduling module 208, in one embodiment, determines a shipping date for a product order based on the second priority of the product order. In one embodiment, for a product order in the plurality of product orders that have been prioritized with respect to each other having a certain second priority, the scheduling module 208 assigns a shipping date that is earlier than the shipping dates of other product orders that have lower second priorities. In another embodiment, for a product order in the plurality of product orders that have been prioritized with respect to each other having a certain second priority, the scheduling module 208 assigns a shipping date that is identical to the shipping dates of other product orders that have lower second priorities. In yet another embodiment, for two or more product orders in a plurality of product orders that have been prioritized with respect to each other having the same second priority, the scheduling module 208 assigns the product orders the same shipping date. In a further embodiment, for two or more product orders in a plurality of product orders that have been prioritized with respect to each other having the same second priority, the scheduling module 208 assigns the product orders different shipping dates.

In one embodiment, the scheduling module 208 determines a shipping date for a product order based on the requested shipping date of the product order. In an embodiment, for a product order in the plurality of product orders that have been prioritized with respect to each other having a certain requested shipping date, the scheduling module 208 assigns a shipping date that is earlier than the shipping dates of other product orders having later requested shipping dates. In an embodiment, for a product order in the plurality of product orders that have been prioritized with respect to each other having a certain requested shipping date, the scheduling module 208 assigns a shipping date that is identical to the shipping dates of other product orders having later requested shipping dates. In yet another embodiment, for two or more product orders in a plurality of product orders that have been prioritized with respect to each other having the same requested shipping date, the scheduling module 208 assigns the product orders the same shipping date. In a further embodiment, for two or more product orders in a plurality of product orders that have been prioritized with respect to each other having the same requested shipping date, the scheduling module 208 assigns the product orders different shipping dates. In a certain embodiment, when assigning the shipping date for a product order, the scheduling module 208 adjusts the shipping date(s) of one or more other product orders.

Figure 3:
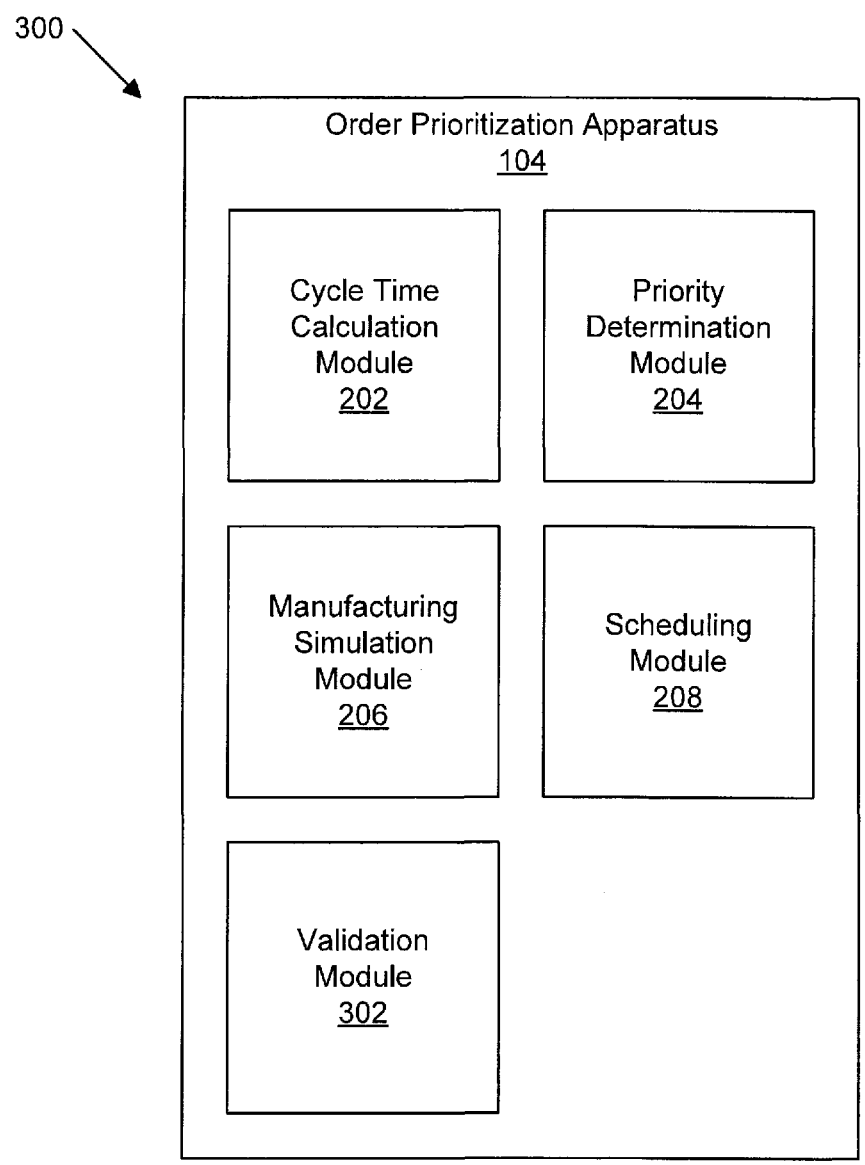
FIG. 3 is a schematic block diagram illustrating another embodiment of an apparatus for determining the priority and shipping date of an order for a manufactured article.

FIG. 3 is a schematic block diagram illustrating another embodiment of an apparatus 300 for determining the priority and shipping date of an order for a manufactured article. The apparatus 300 includes another embodiment of an order prioritization apparatus 104 with a cycle time calculation module 204, a priority determination module 206, a manufacturing simulation module 208, and a schedule module 210, which are substantially similar to those described above in relation to apparatus 200 in FIG. 2. The apparatus 300 also includes a validation module 302, described below.

The validation module 302 assesses whether the first priority for a product order determined by the priority determination module 206 is still valid. In one embodiment, the validation module 302 assesses that the first priority for a product order is invalid if the product order data for a product order has changed. For example, the validation module 302 may determine that the first priority for a product order is invalid if the requested ship date for the product order has changed. In another embodiment, the validation module 302 assesses that the first priority for a product order is invalid if the change(s) in the product order data for a product order results in changes to the cycle time of the product order. In yet another embodiment, the validation module 302 assesses that the first priority for a product order is invalid if the change(s) in the product order data for a product order results in changes to the priority index of the plurality of product orders that have been prioritized with respect to each other. In a further embodiment, the validation module 302 assesses that the first priority for a product order is invalid if a user manually invalidates the first priority for a product order.

Figure 4:
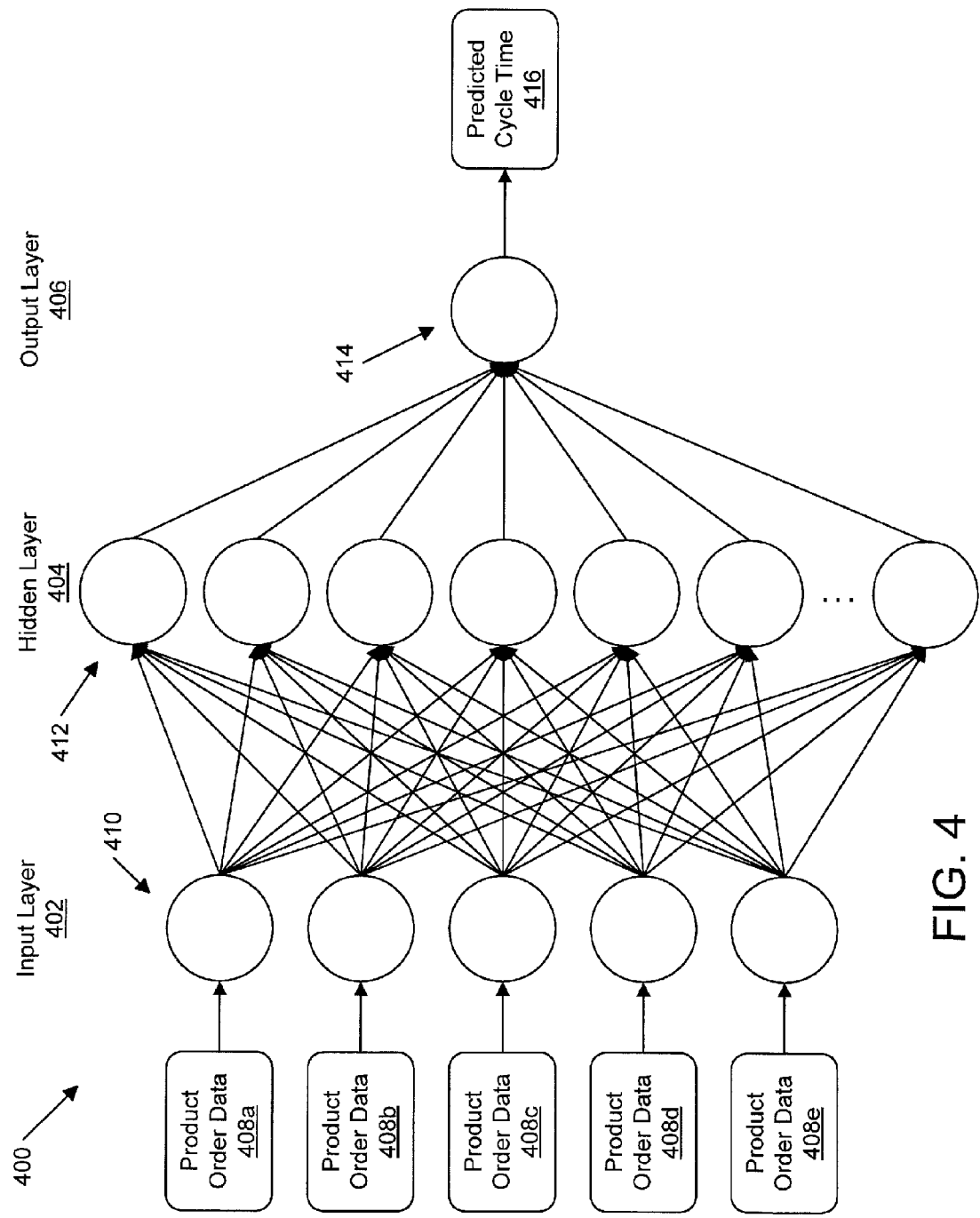
FIG. 4 is a diagram illustrating one embodiment of an artificial neural network for calculating product order cycle time.

FIG. 4 is a diagram illustrating one embodiment of an artificial neural network for calculating product order cycle time. The artificial neural network ("ANN") 400 in FIG. 4 includes an input layer 402, a hidden layer 404, and an output layer 406, which are described further below.

An artificial neural network, in one embodiment, is a collection of interconnected nodes grouped in layers for processing information. Each node in an artificial neural network may be a processing element that receives one or more inputs and applies an activation function to the input(s) to generate an output. The connections between nodes may have weights assigned to them, such that a node may have one or more weighted inputs. In addition, the output of a node may become an input for one or more other nodes.

Artificial neural networks may be used to determine a relationship between variables in observational data. A relationship may be expressed as a weighted linear or non-linear function that maps the value of one or more variables to the value of one or more other variables. Using a learning algorithm and observational data, an artificial neural network may be trained to approximate the weighted function that produces mapping in the observational data.

One method of training artificial neural networks is through backpropagation. A backpropagation algorithm uses training data sets having one or more inputs paired with a known output. To train an artificial neural network, in one embodiment the inputs are propagated through the network. At each layer of nodes within the network, the sum of the weighted inputs may be transformed by an activation function to generate an output that becomes an input for nodes in another layer of the network, until a final output is computed. The computed output may be compared to the known output and their difference may be propagated back through the neural network to adjust the weights of the interconnections between nodes. During the learning phase, this process may be repeated with multiple training data sets to further adjust the weights of the interconnections.

Other independent data sets—each having one or more inputs paired with a known output—are used for testing and validation to avoid overtraining and assess whether the artificial neural network has been sufficiently trained to produce the known output given the one or more inputs. One of skill in the art will recognize other method of training artificial neural networks. Once an artificial neural network has been sufficiently trained to approximate a function that produces the mapping in the observational data, it may be used to calculate a predicted output based on known inputs.

In one embodiment, the ANN 400 has been trained using the backpropagation algorithm to approximate a function that maps the product order data 408a-408e (collectively, 408) for a historical product order to its observed cycle time. In the embodiment, the ANN 400 is trained using sets of product order data 408 and observed cycle times for past product orders, where the product orders are for the same type of products. The ANN 400 may also be tested and validated with independent sets of product order data 408 and observed cycle times for other past product orders. Once the ANN 400 is trained and validated, that ANN 400 may be used to calculate a predicted cycle time 416 for a product order given its product order data 408.

In one embodiment, the input layer 402 of the ANN 400 has a plurality of nodes 410 that receive product order data 408 for a product order as inputs. Product order data 408 may include one or more attributes of the product order that affect the predicted cycle time 416 for the product. In an embodiment, product order data 408 may include order type, the size or scale of the product, the custom features in the product, performance characteristics of the product (e.g., speed, energy efficiency, heat output, power), the complexity of the product (e.g., the number of distinct components used to manufacture the product), a count of each distinct component used to manufacture the product, etc. As an example, the product order data 408 for an order of a high end computer server may include whether the server will be built using brand new components or a mix of new and used components, whether the server will be air cooled or water cooled, the number of cables needed to build the server, the number of cards (e.g., I/O or logic cards) needed to build the server, and the number of books (i.e., a combination of electronic boards, memory cards, modules, and other electronic components) needed to build the server.

In an embodiment, the hidden layer 404 of the ANN 400 has a plurality of nodes 412, where each node receives one or more weighted inputs and applies an activation function to the sum of the weighted input(s) to generate an output. The activation function may be a linear or a non-linear function. In one embodiment, the weighted input(s) received by a node in the hidden layer 404 may come from a node in the input layer 402. Alternatively, the weighted input(s) received by a node in the hidden layer 404 may come from another node in the hidden layer 404.

In one embodiment, the output layer 406 of the ANN 400 has a node 414 that receives a plurality of weighted inputs and applies an activation function to the sum of the weighted inputs to generate a predicted cycle time 416. In one instance, the node 414 of the output layer 406 receives weighted inputs from a subset of the nodes 412 in the hidden layer 404. In another instance, the node 414 of the output layer receives weighted inputs from all the nodes 412 in the hidden layer 404.

Figure 5:
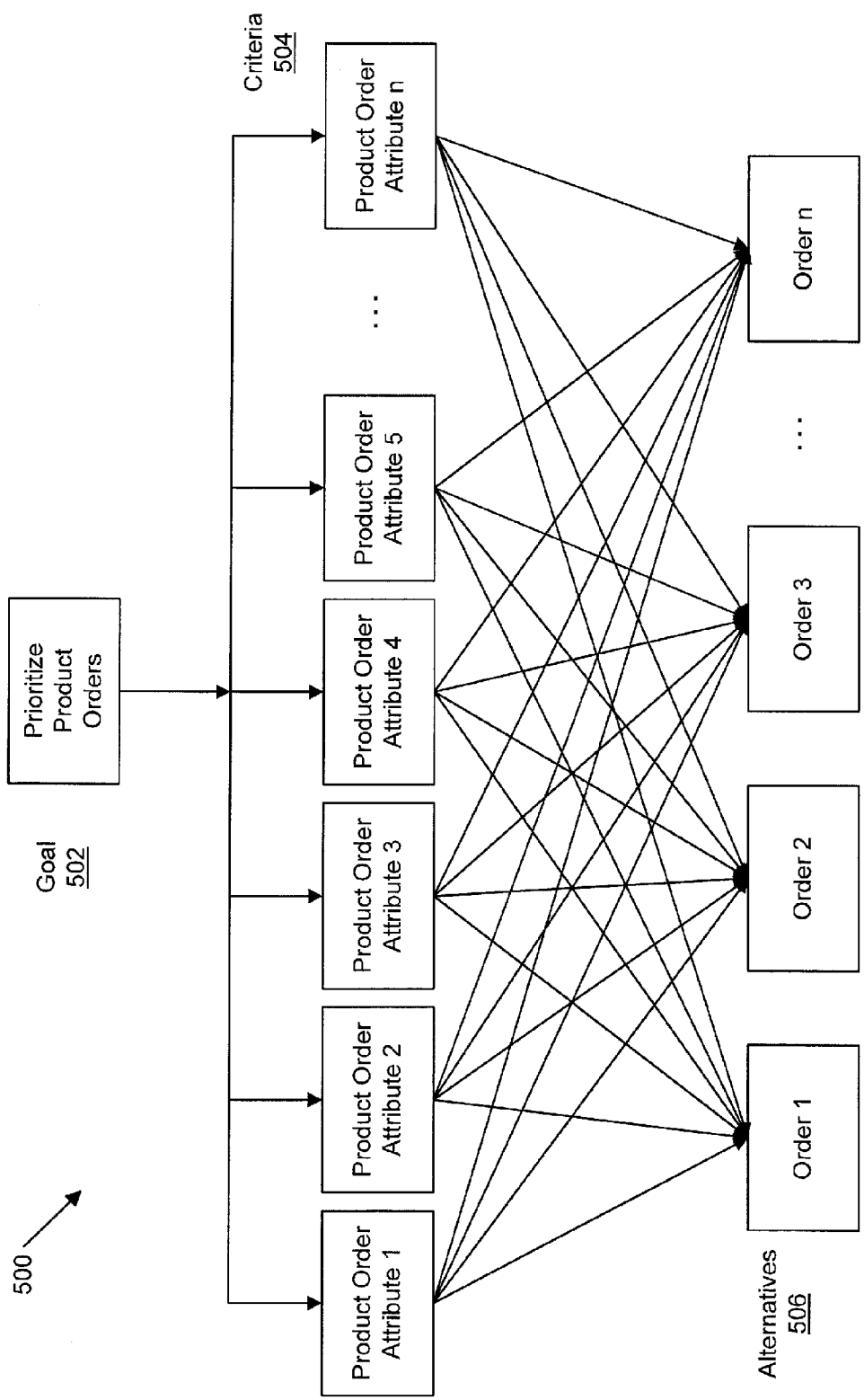
FIG. 5 is a diagram illustrating one embodiment of an analytic hierarchy process for determining product order priorities.

FIG. 5 is a diagram illustrating one embodiment of an analytic hierarchy process 500 for determining product order priorities. The analytic hierarchy process ("AHP") 500 in the embodiment depicted in FIG. 5 includes a goal 502, criteria 504, and alternatives 506, which are described further below.

Analytic hierarchy process is typically a technique for making decisions given a goal, alternatives (i.e., options) for reaching the goal, and criteria for evaluating the alternatives. The process models a decision problem as a hierarchy with the goal at the top of the hierarchy, the alternatives at the bottom, and the criteria in the middle. Within the hierarchy, the goal and each alternative and criterion are each represented by a node. A criterion may have one or more sub-criterion. Each node in an analytic hierarchy process may be associated with a priority value, which, in one embodiment, is a number between zero and one. The priority value of the goal may be 1.000. Similarly, the sum of the priority values of the alternatives may be 1.000. In addition, the priority values of the criteria pertaining to the same level within a hierarchy may add up to 1.000.

Analytic hierarchy process can be used to prioritize alternatives for reaching a goal. The priority value of an alternative relative to the goal may include calculating the priority values of each alternative to each criterion and the priority values of each criterion to the goal. The priority value of the alternatives to a criterion, in one embodiment, is calculated in three steps. First, pairwise comparisons of the alternatives are made with respect to the criterion on a scale, for example, of one to nine, with the weaker alternative assigned a value of one and the stronger alternative assigned a relative value. Second, the pairwise comparison values for each alternative, along with their reciprocal values, are transferred to a square matrix. Third, the principal right eigenvector of the square matrix is computed. The values within this eigenvector are the priority values of the alternatives with respect to the criterion. One of skill in the art will recognize how to compute the principal right eigenvector of the square matrix.

The priority values of the criteria with respect to the goal may be calculated in the same manner. Once the priority values of (i) each criterion with respect to the goal and (ii) each alternative with respect to each criterion are calculated, the priority values of each alternative with respect to the goal is the sum of the products of (i) and (ii).

In one embodiment, the AHP 500 has the goal 502 of prioritizing product orders. The alternatives 506 for reaching the goal 502 may be a plurality of product orders and the criteria 504 for evaluating the alternatives 506 are a plurality of product order attributes. The product order attributes may be characteristics of the product order considered important to determining the priority of a product order. In an embodiment, the product order attributes may include order type, cut-off date, cycle time, critical customer issues, pending time, requested ship date, etc. In one embodiment, the cut-off date for a product order is the number of days remaining between the date of the product order and the last day of the current financial quarter for the country where the revenue for the product order will be booked. In another embodiment, the pending time for a product order is the number of days that a product order will be late.

In the AHP 500, each product order attribute may have a priority value that indicates its relative importance with respect to the goal of prioritizing a plurality of product orders. Similarly, each product order has a priority value that indicates its relative importance with respect to a product order attribute. Furthermore, each product order has a priority value indicating their relative importance to the goal of prioritizing a plurality of product orders. The priority index calculated by the AHP 500, in one embodiment, is comprised of the priority values of each product order with respect to the goal of prioritizing a plurality of product orders. A product order with a higher priority value has a higher order priority.

Figure 6:
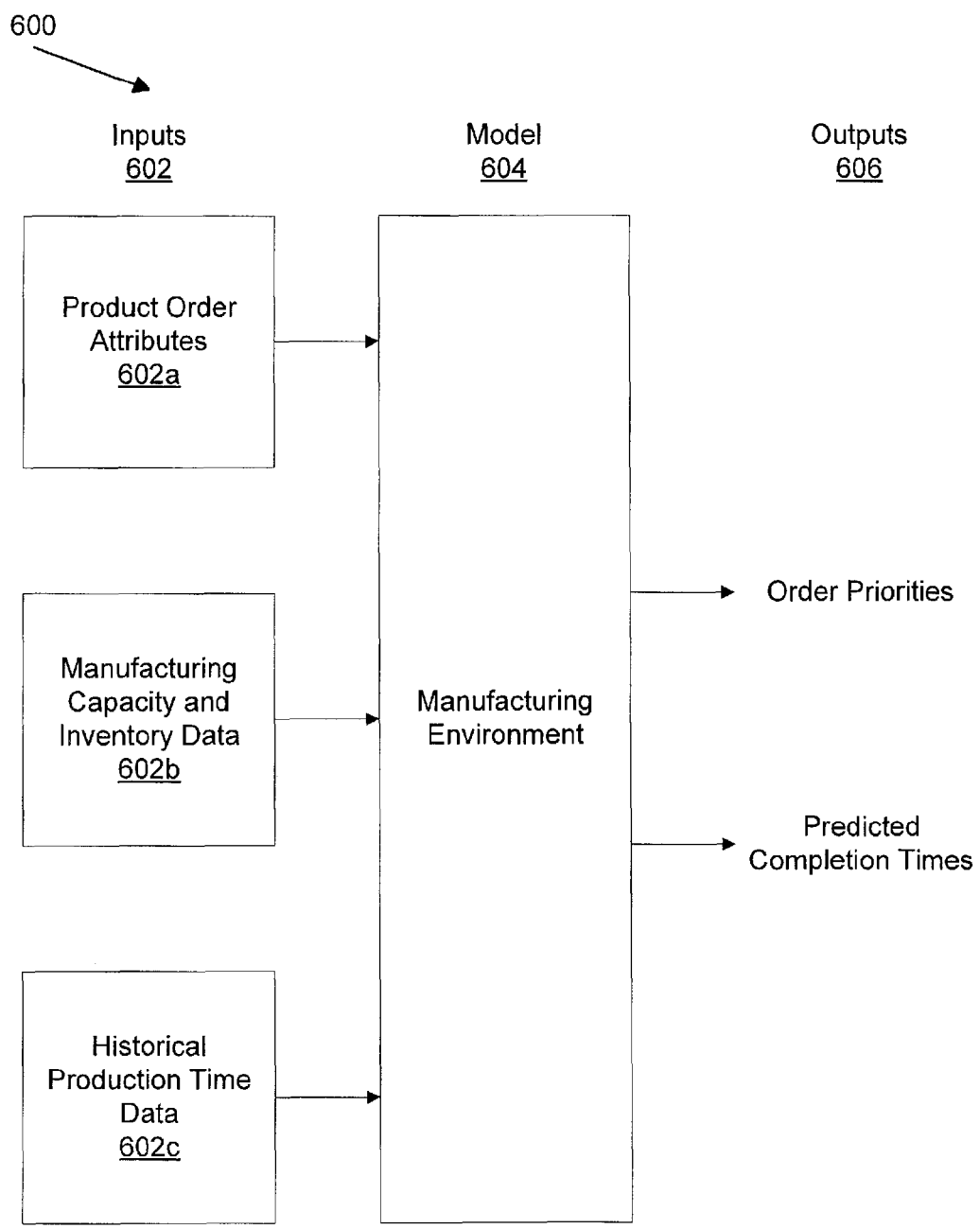
FIG. 6 is a diagram illustrating one embodiment of a system for determining product order priorities.

FIG. 6 is a diagram illustrating one embodiment of a system 600 for determining product order priorities. The system 600 includes inputs 602, a discrete event simulation ("DES") model 604, and outputs 606, which are described further below.

Discrete event simulation is a technique for modeling the operation of a real world process or system over time at distinct points of time using, among other things, models, events, entities, resources, activities, and delays. Typically, a discrete event simulation model represents the actual system to be studied and includes state variables representing the system state. An event may be an occurrence at a certain point in time that changes the state of the system. An entity may represent an object within the system that has one or more attributes. An entity may be dynamic (i.e., it moves through the system) or static (i.e., it serves other entities). A resource may be an entity that serves one or more dynamic entities. Some resources may serve multiple entities simultaneously while other resources cannot. An entity may have to wait in a queue to use a resource. An activity may be a duration of time whose value is known that precedes or follows an event. A delay may be an unknown period of time. Logical rules dictate how state variables change in response to an event and/or resources are captured or released.

In a discrete event simulation model, state variables typically change in response to one or more events occurring at discrete points in time. Entities may compete for resources, which may result in certain entities joining queues to wait for resources. As time moves forward in a discrete simulation model, the system state may be updated at each event along with the capture or release of resources at that time. By adding or removing entities, resources, and/or altering their attributes, a discrete event simulation model can be used to predict how a system operates under multiple scenarios.

In one embodiment, the system 600 includes a DES model 604 that, given a plurality of inputs 602, generates one or more outputs 606. In a certain embodiment, the inputs 602 to the DES model 604 include product order data 602*a* for a plurality of product orders, manufacturing capacity and inventory data 602*b*, and production time data for historical product orders 602*c*. In one embodiment, the product order data 602*a* for a product order include an order priority of the product order, product type, product model, and a count of each distinct component used to manufacture the product. In another embodiment, the manufacturing capacity and inventory data 602*b* include the available number of each distinct component used to manufacture the product and the amount of time required to manufacture the product (i.e., lead time). In a particular embodiment, the manufacturing capacity and inventory data 602*b* is a part of the state of the DES model 604. In a further embodiment, the production time data for historical product orders 602*c* comprise assembly time, testing time, visual inspection time, and packaging time.

In one embodiment, the DES model 604 includes a plurality of entities representing manufacturing stations and workers in the manufacturing environment, along with logical rules that imitate the operations of the manufacturing environment. Using product time data for historical product orders 602*c* and the priority orders for a plurality of product orders, the DES model 604 can determine how its state—as well as inventory levels and lead times for each product order—change over time as product orders move through the manufacturing environment. In an embodiment, a planned shipping date for a product order this is calculated using the lead time of the product order is compared to the requested ship date of the product order to determine if the product order can be manufactured and shipped on time. The DES model 604 may be used to simulate lead times using different order priorities for a product order to find an order priority that would allow the product order to be manufactured and shipped on time. In one embodiment, the outputs 606 of the DES model 604 comprise order priorities for the plurality of product orders that would allow the product orders to be manufactured and shipped on time. In another embodiment, the outputs 606 of the DES model comprise the predicted completion times for each product order of the plurality of orders.

Figure 7:
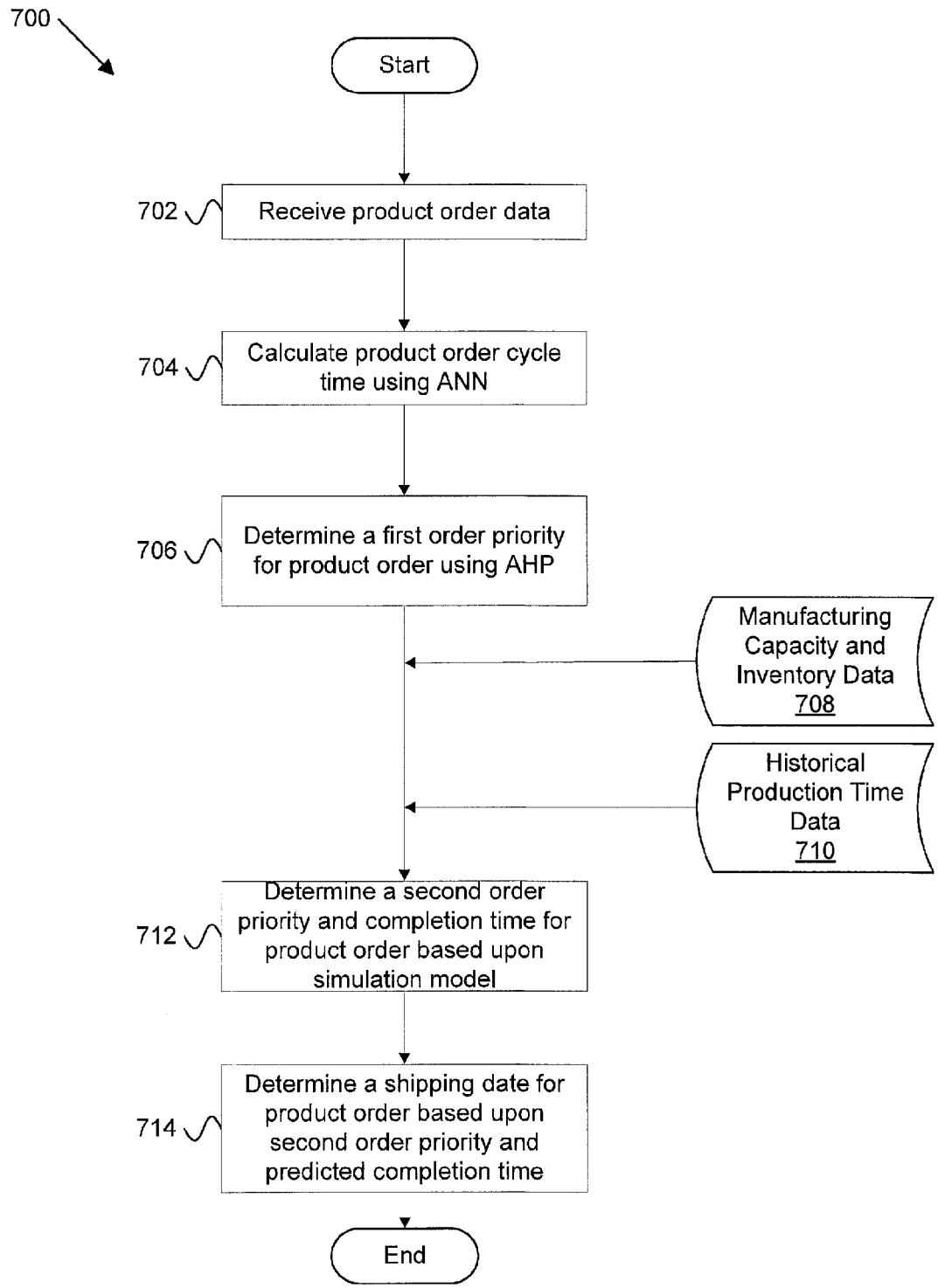
FIG. 7 is a schematic flow chart diagram illustrating one embodiment of a method for determining product order priorities.

FIG. 7 is a schematic flow chart diagram illustrating one embodiment of a method 700 for determining product order priorities. The method 700 begins and receives 702 product order data for a plurality of product orders from one or more clients 102. In one embodiment, the order prioritization apparatus 104 receives 702 product order data. The method 700 calculates 704 a predicted cycle time for each product order using an artificial neural network. In one embodiment, the cycle time calculation module 202 calculates 704 the cycle time. The method 700 determines 706 a first order priority for each product order based upon a priority index calculated using an analytic hierarchy process that has each product order as an alternative and a plurality of product order attributes as criteria. The priority determination module 204 may determine 706 a first order priority. Given manufacturing capacity and inventory data 708 and historical production time data 710, the method 700 determines 712 a second order priority and completion time for each product order based upon a discrete event simulation model. In one embodiment, the manufacturing simulation module 206 determines 712 a second priority. In another embodiment, the manufacturing simulation module 206 determines 712 a completion time. The method 700 determines 714 a shipping date for a product order based on the second order priority and predicted completion time of the product order and the method 700 ends. The scheduling module 208 may determine 714 a shipping date for a product order.

Figure 8:
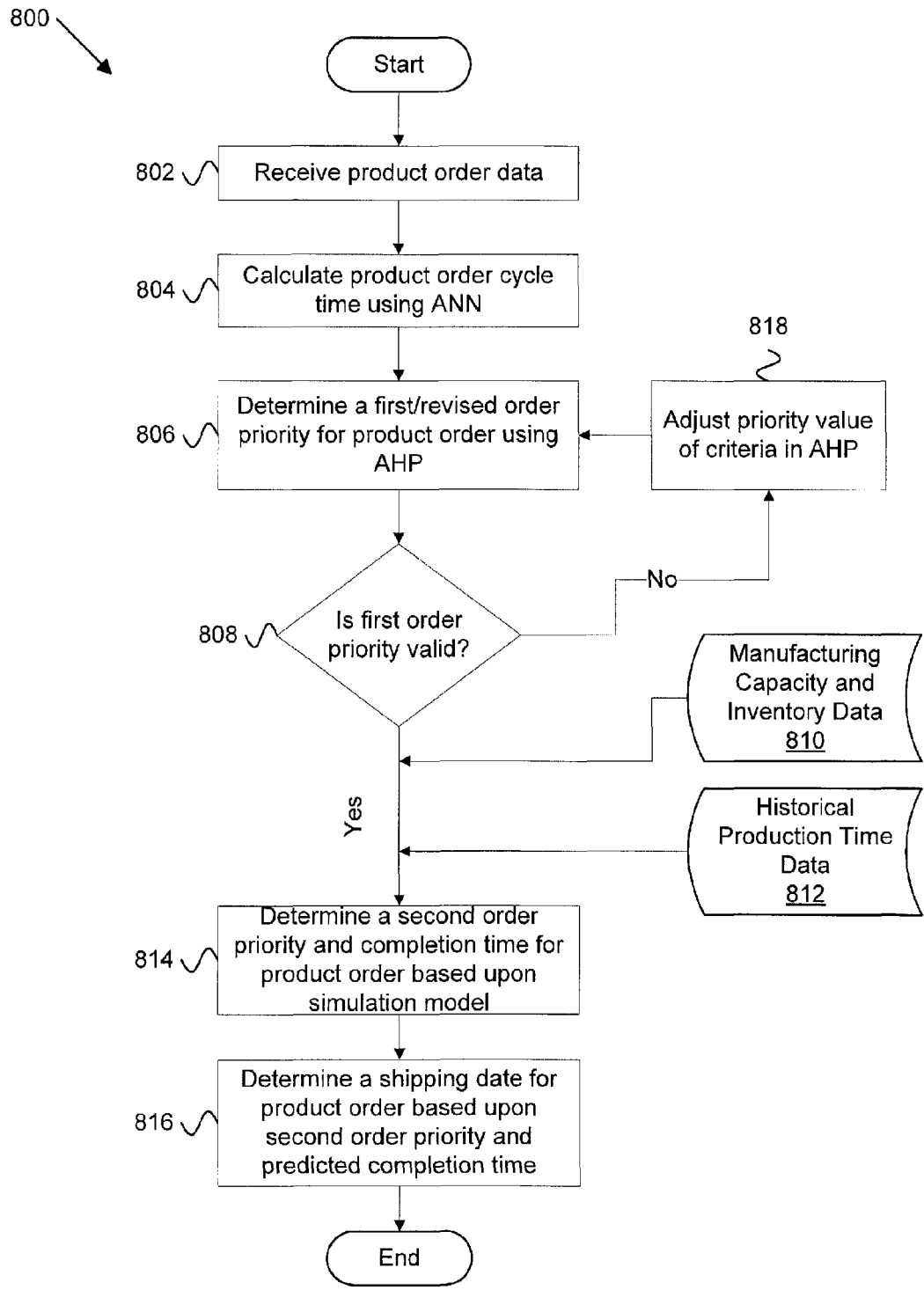
FIG. 8 is a schematic flow chart diagram illustrating another embodiment of a method for determining product order priorities.

FIG. 8 is a schematic flow chart diagram illustrating another embodiment of a method for determining product order priorities. The method 800 begins and in one embodiment, the order prioritization apparatus 104 receives product order data for a plurality of product orders from one or more clients 102. The method 800 calculates 802 a predicted cycle time for each product order using an artificial neural network. The method 800 determines 804 a first order priority for each product order based upon a priority index calculated using an analytic hierarchy process that has each product order as an alternative and a plurality of product order attributes as criteria. The method 800 validates 808 the first priority order for each product order. If the order priority for a product order is invalid, the method 800 adjusts 818 the priority value of one or more criterion in the AHP and determines 806 a revised order priority for each product order. In one embodiment, the validation module 302 validates 808 the first priority order for each product order and adjusts 818 the priority value of one or more criterion and/or determines 806 a revised order priority. Given manufacturing capacity and inventory data 810 and historical production time data 812, the method 800 determines 814 a second order priority and completion time for each product order based upon a discrete simulation model. The method 800 determines 816 a shipping date for a product order based on the second order priority and predicted completion time of the product order and the method 800 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   establishing an artificial neural network, the artificial neural network comprising plurality of computing devices communicatively coupled over a network;
   training each computing device of the artificial neural network using sets of historical product order data;
   generating a function, using the artificial neural network, that maps product order data for an historical product order to its observed cycle time;
   calculating, using the function generated by the artificial neural network, a cycle time for a product order of a plurality of product orders, the cycle time comprising an amount of time to manufacture each product associated with a product order, wherein the cycle time is calculated based on inputs comprising
      product order type; and
      a plurality of component counts, wherein a component count comprises of the number of units of a component used to manufacture the product of the product order;
   calculating a priority index for the product order using an analytic hierarchy process, wherein alternatives evaluated by the analytic hierarchy process comprise the plurality of product orders and criteria of the analytic hierarchy process comprise a plurality of product order attributes, each criterion having a priority value;
   determining a first order priority of the product order based on the priority index;
   determining that a status of the product order attributes associated with the product order has changed;
   determining that the first order priority of the product order is invalid in response to determining that the status of the product order attributes associated with the product order has changed;
   calculating a revised priority index for the product order using the analytic hierarchy process, wherein calculating the revised priority index comprises adjusting the priority value of one or more criterion of the product order in the analytic hierarchy process;
   determining a revised order priority for the product order based on the revised priority index;
   simulating an event based manufacturing model using a plurality of computing devices communicatively coupled over a network, wherein each computing device is configured to perform functions that simulate one of a manufacturing station and a worker in a manufacturing environment based on a plurality of inputs that are based on real data, the plurality of inputs comprising
      the revised order priority of the product order,
      a second set of attributes for the product order comprising product type, product model, and a plurality of component counts;
      manufacturing capacity and inventory data relating to the product order, and
      production time data of historical product orders;
   determining a second order priority and completion time of the product order based on results of the simulation of the event based manufacturing model; and
   determining a shipping date for the product order based on the second order priority and completion time.

2. The method of claim 1, wherein determining a revised order priority of the product order further comprises revising the order priority for one or more other product orders.

3. The method of claim 1, wherein the artificial neural network is trained using historical product order data comprising cycle time, product order type, and a plurality of component counts, wherein a component count consists of the number of units of a component used to manufacture the product of the product order.

4. The method of claim 1, wherein the plurality of product order attributes comprises order type, cut-off date, cycle time, critical customer issues, pending time, and requested ship date.

5. The method of claim 1, wherein the manufacturing capacity and inventory data relating to the product order comprises lead time and a plurality of component inventory counts, wherein a component inventory count comprises of the available number of units of a component used to manufacture the product of the product order.

6. The method of claim 1, wherein the production time data of historical product orders comprise assembly time, testing time, visual inspection time, and packaging time.

7. The method of claim 1, wherein determining a shipping date for the product order further comprises adjusting the shipping date for one or more other product orders.

8. An order prioritization apparatus comprising:
   a cycle time calculation module that:
      establishes an artificial neural network, the artificial neural network comprising plurality of computing devices communicatively coupled over a network;
      trains each computing device of the artificial neural network using sets of historical product order data;
      generates a function, using the artificial neural network, that maps product order data for an historical product order to its observed cycle time; and
      calculates, using the function generated by the artificial neural network, a cycle time for a product order of a plurality of product orders, the cycle time comprising an amount of time to manufacture each product associated with a product order, wherein the cycle time is calculated based on inputs comprising
         product order type; and
         a plurality of component counts, wherein a component count comprises of the number of units of a component used to manufacture the product of the product order;
   a priority determination module that:
      calculates a priority index for the product order using an analytic hierarchy process, wherein alternatives evaluated by the analytic hierarchy process comprise the plurality of product orders and criteria of the analytic hierarchy process comprise a plurality of product order attributes, each criterion having a priority value; and
    determines a first order priority of the product order based on the priority index;
a validation module that:
    determines that a status of the product order attributes associated with the product order has changed; and
    determines that the first order priority of the product order is invalid in response to determining that the status of the product order attributes associated with the product order has changed, wherein the priority determination module calculates a revised priority index for the product order using the analytic hierarchy process, wherein calculating the revised priority index comprises adjusting the priority value of one or more criterion of the product order in the analytic hierarchy process, and determines a revised order priority for the product order based on the revised priority index;
a simulation module that:
    simulates an event based manufacturing module using a plurality of computing devices communicatively coupled over a network, wherein each computing device is configured to perform functions that simulate one of a manufacturing station and a worker in a manufacturing environment based on a plurality of inputs that are based on real data, the plurality of inputs comprising
        the revised order priority of the product order,
        a second set of attributes for the product order comprising product type, product model, and a plurality of component counts;
        manufacturing capacity and inventory data relating to the product order, and
        production time data of historical product orders; and
    determines a second order priority and completion time of the product order based on results of the simulation of the event based manufacturing model; and
a scheduling module that determines a shipping date for the product order based on the second order priority and completion time,
wherein at least a portion of the cycle time calculation module, the priority determination module, the validation module, the simulation module, and the scheduling module comprise one or more of hardware and executable code, the executable code stored on one or more computer readable storage media.

9. The apparatus of claim 8, wherein determining a revised order priority of the product order further comprises revising the order priority for one or more other product orders.

10. The apparatus of claim 8, wherein the artificial neural network is trained using historical product order data comprising cycle time, product order type, and a plurality of component counts, wherein a component count consists of the number of units of a component used to manufacture the product of the product order.

11. The apparatus of claim 8, wherein the plurality of product order attributes comprises order type, cut-off date, cycle time, critical customer issues, pending time, and requested ship date.

12. The apparatus of claim 8, wherein the manufacturing capacity and inventory data relating to the product order comprises lead time and a plurality of component inventory counts, wherein a component inventory count comprises of the available number of units of a component used to manufacture the product of the product order.

13. The apparatus of claim 8, wherein the production time data of historical product orders comprise assembly time, testing time, visual inspection time, and packaging time.

14. The apparatus of claim 8, wherein determining a shipping date for the product order further comprises adjusting the shipping date for one or more other product orders.

15. The apparatus of claim 8, further comprising a server, the server comprising one or more of the cycle time calculation module, the priority determination module, the simulation module, and the scheduling module.

16. A computer program product for order prioritization, the computer program product comprising a non-transitory computer readable storage medium having program code embodied therein, the program code readable/executable by a processor to:
    establish an artificial neural network, the artificial neural network comprising plurality of computing devices communicatively coupled over a network;
    train each computing device of the artificial neural network using sets of historical product order data;
    generate a function, using the artificial neural network, that maps product order data for an historical product order to its observed cycle time;
    calculate, using the function generated by the artificial neural network, a cycle time for a product order of a plurality of product orders, the cycle time comprising an amount of time to manufacture each product associated with a product order, wherein the cycle time is calculated based on inputs comprising
        product order type; and
        a plurality of component counts, wherein a component count comprises of the number of units of a component used to manufacture the product of the product order;
    calculate a priority index for the product order using an analytic hierarchy process, wherein alternatives evaluated by the analytic hierarchy process comprise the plurality of product orders and criteria of the analytic hierarchy process comprise a plurality of product order attributes, each criterion having a priority value;
    determine a first order priority of the product order based on the priority index;
    determine that a status of the product order attributes associated with the product order has changed;
    determine that the first order priority of the product order is invalid in response to determining that the status of the product order attributes associated with the product order has changed;
    calculate a revised priority index for the product order using the analytic hierarchy process, wherein calculating the revised priority index comprises adjusting the priority value of one or more criterion of the product order in the analytic hierarchy process;
    determine a revised order priority for the product order based on the revised priority index;
    simulating an event based manufacturing model using a plurality of computing devices communicatively coupled over a network, wherein each computing device is configured to perform functions that simulate one of a manufacturing station and a worker in a manufacturing environment based on a plurality of inputs that are based on real data, the plurality of inputs comprising
        the revised order priority of the product order, a second set of attributes for the product order comprising product type, product model, and a plurality of component counts;
manufacturing capacity and inventory data relating to the product order, and
production time data of historical product orders;
determining a second order priority and completion time of the product order based on results of the simulation of the event based manufacturing model; and
determine a shipping date for the product order based on the second order priority and completion time.

17. The computer program product of claim 16, wherein the artificial neural network is trained using historical product order data comprising cycle time, product order type, and a plurality of component counts, wherein a component count consists of the number of units of a component used to manufacture the product of the product order.

* * * * *